US012469004B1

(12) United States Patent
Mehta et al.

(10) Patent No.: US 12,469,004 B1
(45) Date of Patent: Nov. 11, 2025

(54) SYSTEMS AND METHODS OF SUPPLY CHAIN INTELLIGENCE CONSTRUCTED ON SEMANTIC SUPPLY CHAIN MODEL

(71) Applicant: Blue Yonder Group, Inc., Scottsdale, AZ (US)

(72) Inventors: Rubesh Mehta, Irving, TX (US); Christopher Duane Burchett, Lewisville, TX (US)

(73) Assignee: Blue Yonder Group, Inc., Scottsdale, AZ (US)

( * ) Notice: Subject to any disclaimer, the term of this patent is extended or adjusted under 35 U.S.C. 154(b) by 130 days.

(21) Appl. No.: 18/126,153

(22) Filed: Mar. 24, 2023

Related U.S. Application Data

(60) Provisional application No. 63/336,568, filed on Apr. 29, 2022.

(51) Int. Cl.
*G06Q 10/00* (2023.01)
*G06N 20/00* (2019.01)
*G06Q 10/087* (2023.01)

(52) U.S. Cl.
CPC .......... *G06Q 10/087* (2013.01); *G06N 20/00* (2019.01)

(58) Field of Classification Search
CPC .............................. G06Q 10/087; G06N 20/00
USPC ............................................................ 705/28
See application file for complete search history.

(56) References Cited

U.S. PATENT DOCUMENTS

2021/0089860 A1* 3/2021 Heere ..................... G06N 20/00
2021/0366586 A1* 11/2021 Ryan .................. G06Q 20/3224

OTHER PUBLICATIONS

George Kousiouris et al., "A microservice-based framework for integrating IoT management platforms, semantic and AI services for supply chain management," vol. 5, Issue 2, pp. 141-145, Jun. 2019.
Rupa Dash et al., "Application of Artificial Intelligence in Automation of Supply Chain Management," Journal of Strategic Innovation and Sustainability vol. 14(3), pp. 43-53, 2019.

* cited by examiner

*Primary Examiner* — Rokib Masud
(74) *Attorney, Agent, or Firm* — Spencer Fane LLP; Steven J. Laureanti

(57) ABSTRACT

A system and method are disclosed for providing supply chain intelligence based on a semantic supply chain model. The method includes building a semantic model of a supply chain, building goals and measures to construct measure graphs to represent supply chain scenarios, storing access and computation information for the measures, relating the measures to the supply chain goals, monitoring the measures associated with the supply chain goals; tuning the measures using machine learning models by tracking outcomes and user actions associated with the measures and goals to update the machine learning models based on the tracked outcomes and user actions, monitoring for abnormal patterns of the measures, triggering, based on a detection of an abnormal pattern, an alert and a resolution, and rendering an alert or a resolution in machine form to supply chain execution systems.

20 Claims, 5 Drawing Sheets

SYSTEMS AND METHODS OF SUPPLY CHAIN INTELLIGENCE CONSTRUCTED ON SEMANTIC SUPPLY CHAIN MODEL

CROSS-REFERENCE TO RELATED APPLICATIONS

The present disclosure is related to that disclosed in the U.S. Provisional Application No. 63/336,568, filed Apr. 29, 2022, entitled "Systems and Methods of Supply Chain Intelligence Constructed on Semantic Supply Chain Model." U.S. Provisional Application No. 63/336,568 is assigned to the assignee of the present application. The present invention hereby claims priority under 35 U.S.C. § 119 (e) to U.S. Provisional Application No. 63/336,568.

TECHNICAL FIELD

The present disclosure relates generally to supply chain intelligence and more specifically to systems and methods of supply chain intelligence built on a semantic supply chain model.

BACKGROUND

Business intelligence (BI) systems help businesses achieve various business goals by monitoring metrics and sending alerts based on thresholds or conditions, which may be used to answer questions and generate analytics about business performance. For example, a BI system may provide sales information for a particular product for a particular sales period. However, these systems cannot directly respond to natural language questions, nor do they automatically provide solutions when monitored metrics reach thresholds or conditions. Further, existing BI dashboards are difficult to navigate and require manual searching. These drawbacks of BI systems hinder business performance, lead to delays in correcting metrics, and are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
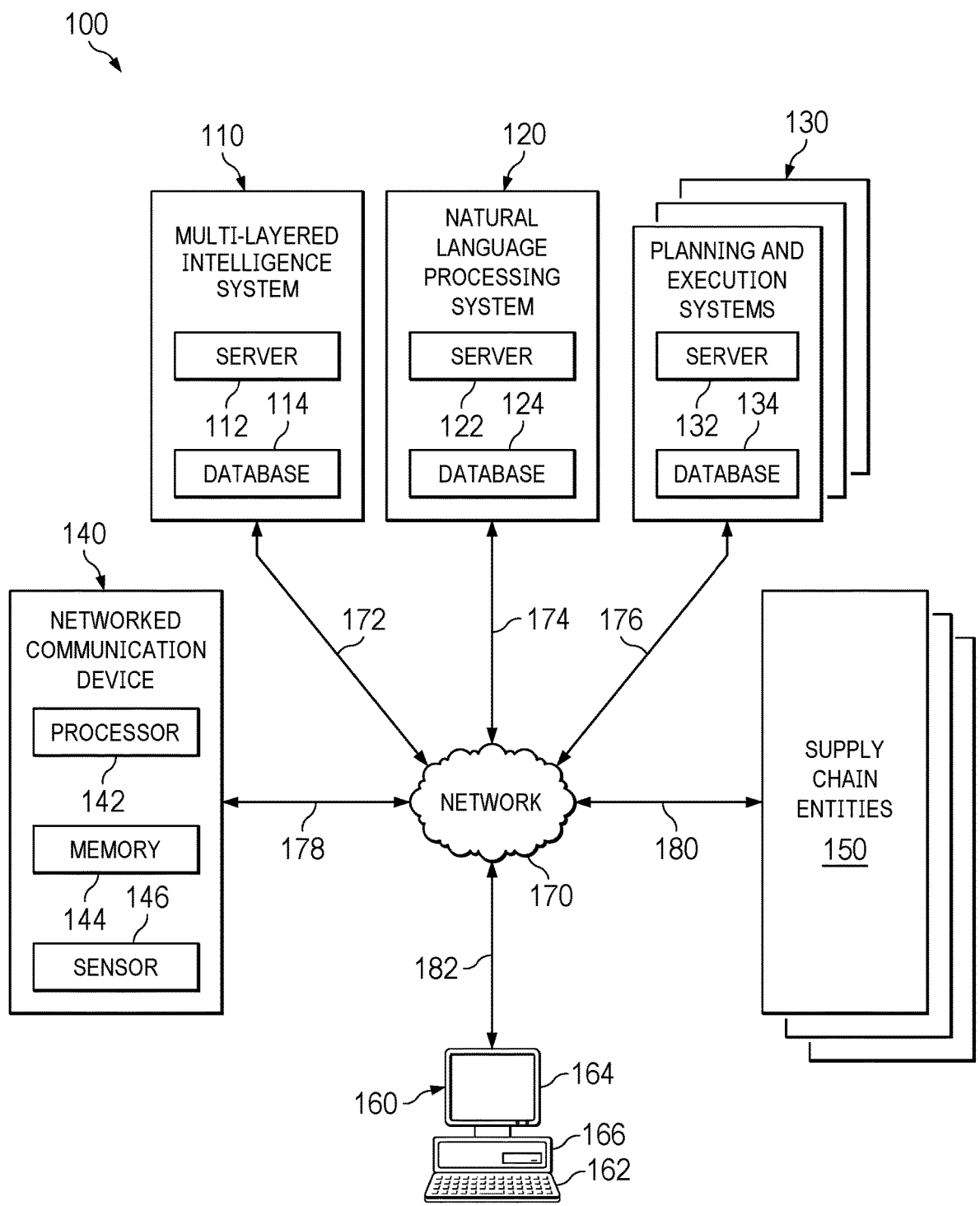
FIG. 1 illustrates a supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates supply chain network 100, in accordance with a first embodiment. Supply chain network 100 comprises multi-layered intelligence system 110, natural language processing system 120, one or more planning and execution systems 130, networked communication device 140, one or more supply chain entities 150, computer 160, network 170, and one or more communication links 172-182. Although a single multi-layered intelligence system 110, a single natural language processing system 120, one or more planning and execution systems 130, a single networked communication device 140, one or more supply chain entities 150, a single computer 160, a single network 170, and one or more communication links 172-182 are shown and described, embodiments contemplate any number of multi-layered intelligence systems, natural language processing systems, planning and execution systems, networked communication devices, supply chain entities, computers, networks, or communication links, according to particular needs.

In one embodiment, multi-layered intelligence system 110 comprises server 112 and database 114. Server 112 of multi-layered intelligence system 110 comprises one or more modules that integrate a natural language conversation-based interface with supply chain intelligence built on semantic model 204 (FIG. 2) of the supply chain to provide user- or machine-actionable supply chain insights. As described in further detail below, supply chain intelligence layer 306 (FIG. 3) of multi-layered intelligence system 110 calculates relationships and correlations of one or more measures using semantic model 204. Embodiments of multi-layered intelligence system 110 comprise supply chain brain layer 430 (FIG. 4) that utilizes various models (such as, for example, historical, statistical, heuristic, and/or mathematical) to evaluate and modify an association between one or more monitored measures and one or more goals. Multi-layered intelligence system 110 provides natural language alerts 238, insights, and recommendations, which are continually updated by supply chain brain layer 430 based, at least in part, on user interactions and adjusting measures and strategies by monitoring outcomes.

In one embodiment, natural language processing system 120 comprises server 122 and database 124. Natural language processing system 120 generates a graphical user interface (GUI) with keyboard- and conversation-based interfaces supported by natural language processing (NLP) to provide voice- or text-based interactions. One or more modules of server 122 provide the GUI with predictive, intelligent, and context-dependent recommendations for actions and navigations to complete user-based tasks. In addition, multi-layered intelligence system 110 may provide context-specific navigations using machine-learning based predictions and analytics. Database 124 may comprise one or more databases or other data storage arrangement at one or more locations local to, or remote from, server 122.

One or more planning and execution systems 130 of supply chain network 100 comprise server 132 and database 134. According to embodiments, one or more planning and execution systems 130 perform one or more distinct and dissimilar processes, including, for example, assortment planning, demand planning, operations planning, production planning, supply planning, distribution planning, execution, pricing, forecasting, transportation management, warehouse management, inventory management, fulfilment, procurement, and the like. Server 132 of one or more planning and execution systems 130 comprises one or more modules, such as, for example, planning module 270, execution module 272, modeler 274, and/or solver 276, for performing activities of one or more planning and execution processes. Server 132 of one or more planning and execution systems 130 stores and retrieves data from database 134 or from one or more locations in supply chain network 100. In addition, one or more planning and execution systems 130 operate on one or more computers 160 that are integral to, or separate from, the hardware and/or software that support multi-layered intelligence system 110, natural language processing system 120, networked communication device 140, or one or more supply chain entities 150.

By way of example only and not by way of limitation, one or more planning and execution systems 130 comprise a transportation network. One or more planning and execution systems 130 comprising a transportation network comprises server 132 and database 134. According to embodiments, the transportation network comprises a transportation management system directing one or more transportation vehicles to ship one or more items between one or more supply chain entities 150, based, at least in part, on a supply chain plan, such as, for example, a supply chain master plan, the number of items currently in stock at one or more supply chain entities 150 or other stocking location, the number of items currently in transit in the transportation network, a forecasted demand, a supply chain disruption, and/or one or more other factors described herein. One or more transportation vehicles comprise, for example, any number of trucks, cars, vans, boats, airplanes, unmanned aerial vehicles (UAVs), cranes, robotic machinery, or the like. The one or more transportation vehicles may comprise radio, satellite, or other communication that communicates location information (such as, for example, geographic coordinates, distance from a location, global positioning satellite (GPS) information, or the like) with multi-layered intelligence system 110, one or more planning and execution systems 130, networked communication device 140, and/or one or more supply chain entities 150 to identify the location of the one or more transportation vehicles and the location of any inventory or shipment located on the one or more transportation vehicles.

By way of a further example only and not by way of limitation, one or more planning and execution systems 130 comprise a warehouse management system. According to embodiments, server 132 of one or more planning and execution systems 130 comprising a warehouse management system comprises one or more modules that manage and operate warehouse operations, plan timing and identity of shipments, generate picklists, packing plans, and instructions. The warehouse management system instructs users and/or automated machinery to obtain picked items and generates instructions to guide placement of items on a picklist in the configuration and layout determined by a packing plan. For example, the instructions may instruct a user and/or automated machinery to prepare items on a picklist for shipment by obtaining the items from inventory or a staging area and packing the items on a pallet in a proper configuration for shipment. Embodiments contemplate the warehouse management system determining routing, packing, or placement of any item, package, or container into any packing area, including, packing any item, package, or container in another item, package, or container. The warehouse management system may generate instructions for packing products into boxes, packing boxes onto pallets, packing loaded pallets into trucks, or placing any item, container, or package in a packing area, such as, for example, a box, a pallet, a shipping container, a transportation vehicle, a shelf, a designated location in a warehouse (such as a staging area), and the like.

In addition, or as an alternative, one or more planning and execution systems 130 comprise or are operably coupled with an inventory system. Server 132 of one or more planning and execution systems 130 comprising or operably coupled with an inventory system is configured to receive and transmit item data, including item identifiers, pricing data, attribute data, inventory levels, and other like data about one or more items at one or more stocking locations in supply chain network 100. Server 132 of one or more planning and execution systems 130 comprising or operably coupled with an inventory system stores and retrieves item data from database 134 or from one or more locations in supply chain network 100.

By way of a further example only and not by way of limitation, one or more planning and execution systems 130 may include a supply chain planner. The supply chain planner models and solves supply chain planning problems (such as, for example, operation planning problems) and generates the supply chain planning problem solutions. Embodiments contemplate providing the supply chain planning data, models, problems, and solutions to knowledge base 254 of natural language processing system 120.

One or more networked communication devices 140 comprise one or more processors 142, memory 144, one or more sensors 146, and may include any suitable input device, output device, fixed or removable computer-readable storage media, or the like. According to embodiments, one or more networked communication devices 140 comprise an electronic device that receives imaging data from one or more sensors 146 or from one or more databases in supply chain network 100. One or more sensors 146 of one or more networked communication devices 140 may comprise an imaging sensor, such as, a camera, scanner, electronic eye, photodiode, charged coupled device (CCD), or any other electronic component that detects visual characteristics (such as color, shape, size, fill level, or the like) of objects. One or more networked communication devices 140 may comprise, for example, a mobile handheld electronic device such as, for example, a smartphone, a tablet computer, a wireless communication device, and/or one or more networked electronic devices configured to image items using one or more sensors 146 and transmit product images to one or more databases. In addition, or as an alternative, one or more sensors 146 may comprise a radio receiver and/or transmitter configured to read an electronic tag, such as, for example, a radio-frequency identification (RFID) tag. Each item may be represented in supply chain network 100 by an identifier, including, for example, Stock-Keeping Unit (SKU), Universal Product Code (UPC), serial number, barcode, tag, RFID, or like objects that encode identifying information. One or more networked communication devices 140 may generate a mapping of one or more items in supply chain network 100 by scanning an identifier or object associated with an item and identifying the item based, at least in part, on the scan. This may include, for example, a stationary scanner located at one or more supply chain entities 150 that scans items as the items pass near the scanner. As explained in more detail below, multi-layered intelligence system 110, one or more planning and execution systems 130, networked communication devices 140, and/or one or more supply chain entities 150 may use the mapping of an item to locate the item in supply chain network 100. The location of the item may be used to coordinate the storage and transportation of items in supply chain network 100 according to one or more actions, tasks, scenarios, plans and/or a reallocation of materials or capacity generated by one or more planning and execution systems 130. Plans may comprise a supply chain plan, such as, for example, one or more of a master supply chain plan, production plan, operations plan, distribution plan, and the like. The plans may be selected according to one or more scenarios and are generated and modified by one or more actions and tasks.

One or more supply chain entities 150 may include, for example, one or more retailers, distribution centers, manufacturers, suppliers, customers, and/or similar business entities configured to manufacture, order, transport, or sell one or more products. Retailers may comprise any online or brick-and-mortar store that sells one or more products to one or more customers. Manufacturers may be any suitable entity that manufactures at least one product, which may be sold by one or more retailers. Suppliers may be any suitable entity that offers to sell or otherwise provides one or more items (i.e., materials, components, or products) to one or more manufacturers.

As shown in FIG. 1, supply chain network 100 comprising multi-layered intelligence system 110, natural language processing system 120, one or more planning and execution systems 130, one or more networked communication devices 140, and one or more supply chain entities 150 may operate on one or more computers 160 that are integral to or separate from the hardware and/or software that support multi-layered intelligence system 110, natural language processing system 120, one or more planning and execution systems 130, one or more networked communication devices 140, and one or more supply chain entities 150. One or more computers 160 may include any suitable input device 162, such as a keypad, mouse, touch screen, microphone, or other device to input information. Output device 164 may convey information associated with the operation of supply chain network 100, including digital or analog data, visual information, or audio information.

One or more computers 160 may include fixed or removable computer-readable storage media, including a non-transitory computer readable medium, magnetic computer disks, flash drives, CD-ROM, in-memory device, or other suitable media to receive output from and provide input to supply chain network 100. One or more computers 160 may include one or more processors 166 and associated memory to execute instructions and manipulate information according to the operation of supply chain network 100 and any of the methods described herein. In addition, or as an alternative, embodiments contemplate executing the instructions on one or more computers 160 that cause one or more computers 160 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible computer-readable media that have computer-readable instructions encoded thereon, and the instructions may comprise instructions to perform functions of the methods described herein.

Multi-layered intelligence system 110, natural language processing system 120, one or more planning and execution systems 130, one or more networked communication devices 140, and one or more supply chain entities 150 may each operate on one or more separate computers 160, a network of one or more separate or collective computers 160, or may operate on one or more shared computers 160. In addition, supply chain network 100 may comprise a cloud-based computing system having processing and storage devices at one or more locations, local to, or remote from multi-layered intelligence system 110, natural language processing system 120, one or more planning and execution systems 130, one or more networked communication devices 140, and one or more supply chain entities 150. In addition, each of one or more computers 160 may be a workstation, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with multi-layered intelligence system 110, natural language processing system 120, one or more planning and execution systems 130, one or more networked communication devices 140, and one or more supply chain entities 150.

These one or more users may include, for example, a "manager" or a "planner" handling supply chain planning, configuring multi-layered intelligence system 110, and/or one or more related tasks within supply chain network 100. In addition, or as an alternative, these one or more users within supply chain network 100 may include, for example, one or more computers 160 programmed to autonomously handle, among other things, production planning, demand planning, option planning, sales and operations planning, operation planning, supply chain master planning, plan adjustment after supply chain disruptions, order placement, automated warehouse operations (including removing items from and placing items in inventory), robotic production machinery (including producing items), and/or one or more related tasks within supply chain network 100.

In one embodiment, multi-layered intelligence system 110 may be coupled with network 170 using communication link 172, which may be any wireline, wireless, or other link suitable to support data communications between multi-layered intelligence system 110 and network 170 during operation of supply chain network 100. Natural language processing system 120 may be coupled with network 170 using communication link 174, which may be any wireline, wireless, or other link suitable to support data communications between natural language processing system 120 and network 170 during operation of supply chain network 100. One or more planning and execution systems 130 may be coupled with network 170 using communication link 176, which may be any wireline, wireless, or other link suitable to support data communications between one or more planning and execution systems 130 and network 170 during operation of supply chain network 100. Networked communication device 140 may be coupled with network 170 using communication link 178, which may be any wireline, wireless, or other link suitable to support data communications between networked communication device 140 and network 170 during operation of supply chain network 100. One or more supply chain entities 150 may be coupled with network 170 using communication link 180, which may be any wireline, wireless, or other link suitable to support data communications between one or more supply chain entities 150 and network 170 during operation of supply chain network 100. One or more computers 160 may be coupled with network 170 using communication link 182, which may be any wireline, wireless, or other link suitable to support data communications between one or more computers 160 and network 170 during operation of supply chain network 100.

Although communication links 172-182 are shown as generally coupling multi-layered intelligence system 110, natural language processing system 120, one or more planning and execution systems 130, networked communication device 140, one or more supply chain entities 150, and computers 160 to network 170, each of multi-layered intelligence system 110, natural language processing system 120, one or more planning and execution systems 130, networked communication device 140, one or more supply chain entities 150, and computers 160 may communicate directly with each other, according to particular needs.

In another embodiment, network 170 includes the Internet and any appropriate local area networks (LANs), metropolitan area networks (MANs), or wide area networks (WANs) coupling multi-layered intelligence system 110, natural language processing system 120, one or more planning and execution systems 130, networked communication device 140, one or more supply chain entities 150, and computer 160. For example, data may be maintained locally or externally of multi-layered intelligence system 110, natural language processing system 120, one or more planning and execution systems 130, networked communication device 140, one or more supply chain entities 150, and computer 160 and made available to one or more associated users of multi-layered intelligence system 110, natural language processing system 120, one or more planning and execution systems 130, networked communication device 140, one or more supply chain entities 150, and computer 160 using network 170 or in any other appropriate manner. Those skilled in the art will recognize that the complete structure and operation of network 170 and other components within supply chain network 100 are not depicted or described. Embodiments may be employed in conjunction with known communications networks and other components.

In accordance with the principles of embodiments described herein, one or more planning and execution systems 130 may generate a supply chain plan. Furthermore, one or more computers 160 associated with multi-layered intelligence system 110 and one or more planning and execution systems 130 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of items based on a supply chain plan, one or more tasks, actions, and scenarios generated by one or more users and which may be used to generate or modify the supply chain plan, the number of items currently in stock at one or more supply chain entities 150, the number of items currently in transit in the transportation network, a forecasted demand, a supply chain disruption, a material or capacity reallocation, current and projected inventory levels at one or more stocking locations, and/or one or more additional factors described herein. For example, the methods described herein may include computers 160 receiving product data 284 from automated machinery having one or more sensors 146 and product data 284 corresponding to an item detected by the automated machinery. Received product data 284 may include an image of the item, an identifier, as disclosed above, and/or product information associated with the item, including, for example, dimensions, texture, estimated weight, and the like. Computers 160 may also receive from one or more sensors 146 of one or more networked communication devices 140, a current location of the identified item.

Figure 2:
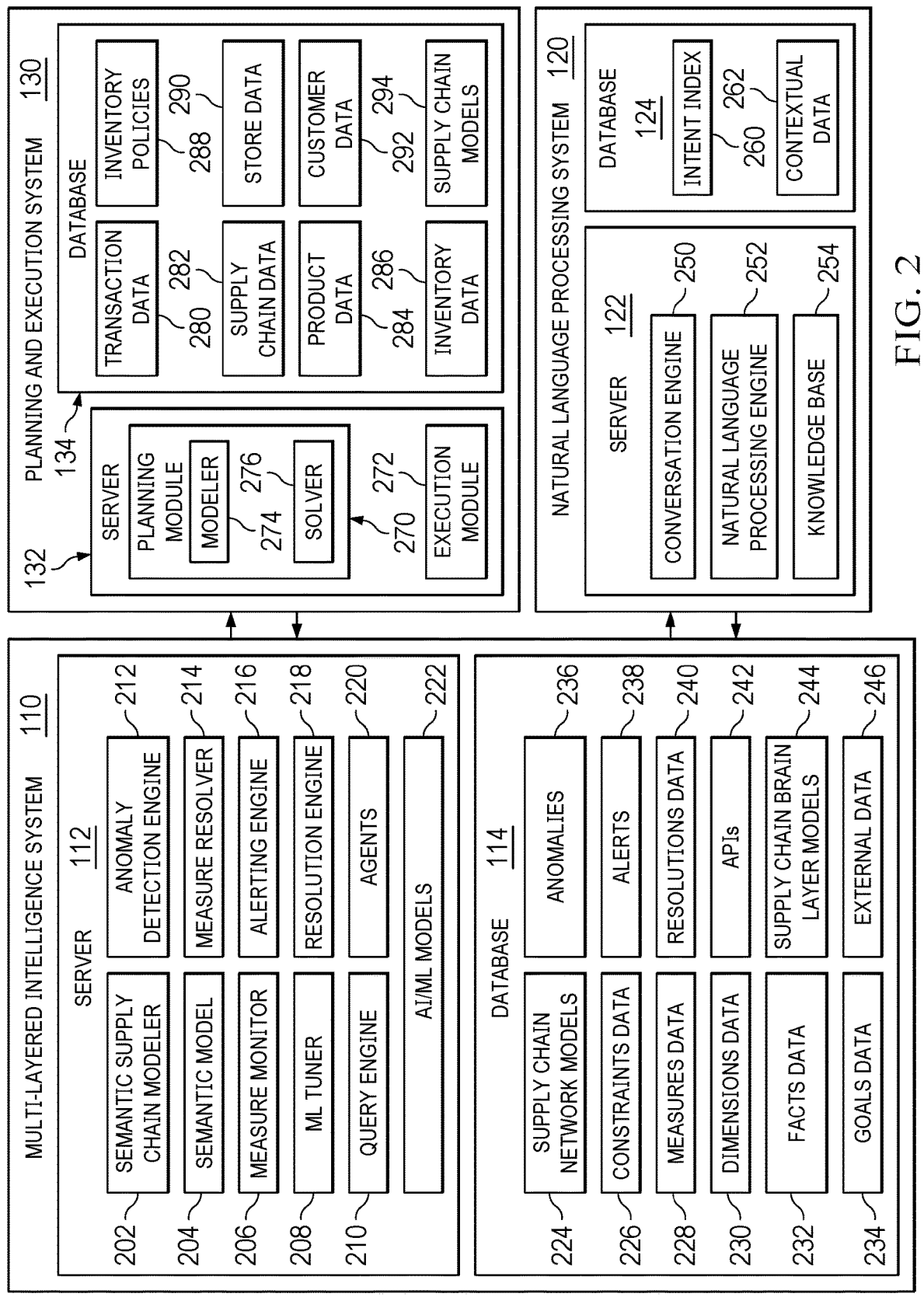
FIG. 2 illustrates the multi-layered supply chain intelligence system, the natural language processing system, and the planning and execution system of FIG. 1 in greater detail, in accordance with an embodiment.

FIG. 2 illustrates multi-layered intelligence system 110, natural language processing system 120, and planning and execution system 130 of FIG. 1 in greater detail, in accordance with an embodiment. Multi-layered intelligence system 110 comprises server 112 and database 114, as disclosed above. Although multi-layered intelligence system 110 is shown as comprising a single server 112 and a single database 114, embodiments contemplate any suitable number of servers or databases internal to or externally coupled with multi-layered intelligence system 110.

Server 112 of multi-layered intelligence system 110 comprises semantic supply chain modeler 202, semantic model 204, measure monitor 206, machine learning (ML) tuner 208, query engine 210, anomaly detection engine 212, measure resolver 214, alerting engine 216, resolution engine 218, agents 220, and artificial intelligence (AI)/ML models 222. Although server 112 is shown and described as comprising a single semantic supply chain modeler 202, a single semantic model 204, a single measure monitor 206, a single ML tuner 208, a single query engine 210, a single anomaly detection engine 212, a single measure resolver 214, a single alerting engine 216, a single resolution engine 218, one or more agents 220, and one or more AI/ML models 222, embodiments contemplate any suitable number or combination of these located at one or more locations, local to, or remote from multi-layered intelligence system 110, such as on multiple servers or computers 160 at one or more locations in supply chain network 100.

Semantic supply chain modeler 202 generates a measure model of one or more supply chain measures. According to embodiments, the one or more measures may be received from one or more planning and execution systems 130, received from one or more external systems 470, or computed by supply chain brain layer 430 using heuristics, predictive models, prescriptive models, and/or the like. As described in further detail below, multi-layered intelligence system 110 creates integrated semantic model 204 of data, facts, measures, and associated KPIs to provide natural language user-interactions that utilize a semantic understanding of the supply chain.

Semantic model 204 captures and stores access and computation information for one or more measures, as described in further detail below. According to embodiments, semantic model 204 tracks relationships among the one or more measures, whether the one or more measures are synonymous or connected, and how the one or more measures are sourced. As described in further detail below, semantic model 204 represents supply chain elements and provides a basis for semantic supply chain modeler 202 to build one or more goals, dimensions, facts, and/or measures.

Measure monitor 206 monitors and correlates one or more measures of supply chain data 282. As described in further detail below, each of one or more measures is captured with associated synonyms, related terms, associated dimensions, attributes, features, and/or a data source. According to embodiments, the data source of one or more measures comprises the data facts, cubes, systems, APIs 242, or other data source used to calculate or retrieve the one or more measures.

ML tuner 208 adjusts the measure graph to fine-tune the one or more measures using one or more ML approaches. In one embodiment, ML tuner 208 tracks outcomes and user actions to learn and capture what measures and/or KPIs indicate achieving one or more supply chain or business goals.

Query engine 210 responds to queries 422 based on a semantic understanding of the supply chain. According to embodiments, query engine 210 responds to user- or bot-initiated queries 422 and automatically responds in the appropriate machine-readable or natural language format. Query engine 210 provides strategy and planning intelligence for the supply chain and the business. According to embodiments, this intelligence provides answers to common queries such as, for example, requesting brand and category performance information, supply and demand plan effectiveness for a particular period (e.g., quarterly), identifying the most profitable products, alerting for out-of-stock items, and the like. In addition, or as an alternative, the intelligence provides answers to higher-level inquiries, such as, for example, what actions are recommended to achieve particular supply chain goals. By way of example only and not by way of limitation, higher-level inquiries comprise a query for the actions recommended to achieve a twenty percent lift in demand for a certain product or discovering and reporting the root causes for an item's actual demand not aligning with a forecast. As described in further detail below, multi-layered intelligence system 110 accesses recommendations and alerts 238 with root causes, identifies appropriate resolution options, and executes a strategy or scenario that makes the most business sense.

Anomaly detection engine 212 utilizes ML approaches to identify when measures show abnormal patterns. According to one embodiment, anomaly detection engine 212 detects outliers on one or more of the monitored measures. According to embodiments, anomaly detection engine 212 tracks one or more monitored measures associated with one or more goals. By way of example only and not by way of limitation, one or more monitored measures comprise KPIs that are tracked against a target. In some embodiments, anomaly detection engine 212 tracks one or more measures and one or more KPIs associated with a business goal, such as, for example, a quarterly target, to determine whether the monitored measures are aligned with the expected values to achieve the goals. When one or more monitored measures are not tracking with the expected values needed to achieve the associated goal, anomaly detection engine 212 may trigger one or more alerts 238 and/or one or more resolutions. According to embodiments, one or more abnormal measures detected by anomaly detection engine 212 triggers alerting engine 216 to generate one or more alerts 238 and/or resolution engine 218 to generate one or more resolutions, as described in further detail below.

Measure resolver 214 resolves queries 422 issued by a user or agent 220 to the measure that maps to the intent in query 422 using its measure graph knowledge base, which may be stored in knowledge base 254. The measure graph knowledge base is constantly being refined and learnt by supply chain brain layer 430 using ML algorithms.

Alerting engine 216 generates one or more alerts 238 in response to one or more anomalies 236 detected by anomaly detection engine 212. According to embodiments, alerting engine 216 sends alert 238 to natural language processing system 120 to render a natural language form of alert 238 that notifies a user of anomaly 236. In addition, or as an alternative, alerting engine 216 sends alert 238 to agent 220 in a machine-readable form for communication to one or more execution systems 490. According to some embodiments, alerting engine 216 and resolution engine 218 communicates alert 238 and a resolution for the same anomaly 236. Alert 238 may provide an indication that the one or more measures are not aligned with the expected values to achieve the associated goal and the resolution may provide one or more options to modify the supply chain to correct anomaly 236 and achieve, at least in part, the one or more goals associated with anomalous measures.

Resolution engine 218 generates one or more resolutions that resolve, at least in part, anomaly 236 detected by anomaly detection engine 212. According to embodiments, resolution engine 218 correlates detected anomaly 236 with the current supply chain context and recommends the optimal solution using AI and ML approaches. In addition, or as an alternative, supply chain brain layer 430 trains a machine learning model to learn from executed resolutions to generate resolutions that result in better outcomes for the enterprise. By way of example only and not by way of limitation, executed resolutions may include one or more simulated resolutions. Resolution engine 218 may generate the one or more resolutions in a machine-readable form and sent to one or more agents 220 for execution by one or more execution systems 490. Embodiments contemplate the one or more resolutions sent to natural language processing system 120 for rendering in a natural language form and communicated to one or more client devices 480 associated with one or more users. By way of example only and not by way of limitation, one or more resolutions may comprise, for example, marking down a price, selecting a different supplier, using a differing shipper or shipping method, and the like.

Agents 220 communicate machine form alerts 238 and resolutions to one or more execution systems 490. According to embodiments, agents 220 execute supply chain transformations in response to alerts 238 and resolutions from multi-layered intelligence system 110 at one or more systems 490. By way of example only and not by way of limitation, agent 220 may execute a price adjustment resolution by communicating the calculated price change to a price adjustment system. According to one embodiment, agent 220 communicates the resolution using one or more JSON-formatted communications.

According to embodiments, multi-layered intelligence system 110 comprises one or more AI and/or ML models 222 utilized by the modules and engines of multi-layered intelligence system 110. As disclosed above, AI and ML models 222 are utilized by supply chain brain layer 430 to calculate one or more measures, tune and adjust one or more monitored measures, detect one or more anomalies 236, and/or generate one or more alerts 238 and resolutions. According to embodiments, AI and ML models 222 build and evolve a measure graph that represents the measure model of the one or more measures.

Database 114 of multi-layered intelligence system 110 comprises supply chain network models 224, constraints data 226, measures data 228, dimensions data 230, facts data 232, goals data 234, anomalies 236, alerts 238, resolutions data 240, APIs 242, supply chain brain layer models 244, and external data 246. Although database 114 is shown and described as comprising supply chain network models 224, constraints data 226, measures data 228, dimensions data 230, facts data 232, goals data 234, anomalies 236, alerts 238, resolutions data 240, APIs 242, supply chain brain layer models 244, and external data 246, embodiments contemplate any suitable number or combination of these located at one or more locations, local to, or remote from multi-layered intelligence system 110, such as on multiple servers or computers 160 at one or more locations in supply chain network 100.

Supply chain network models 224 represent the flow of materials through one or more supply chain entities 150 of supply chain network 100. Supply chain network models 224 represent supply chain network 100 having buffers for one or more items. An item at a first buffer may be transformed into a different item at second buffer by an operation. Edges of supply chain network models 224 indicate the flow of items between one or more buffers and one or more operations. By way of example only and not by way of limitation, a first buffer may represent a buffer for a sub-assembly which is processed by an operation into a finished good represented by a different buffer. Supply chain network models 224 include network representation models, comprising a network of nodes and edges, such as a network representation model of a supply chain network. According to embodiments, a network representation model comprises material storage and/or transition units modelled as nodes which represent buffers, and which may be referred to as, for example, buffer nodes, buffers, or nodes. Each of the nodes may represent a buffer for an item (such as, for example, a raw material, intermediate good, finished good, sub-assembly, component, and the like), resource, or the like. Edges may represent the flow, transportation, or assembly of materials (such as items or resources) between the nodes. The edges between nodes of different items may represent operations, such as, for example, a production operation, assembly operation, transportation operation, and the like. The network representation model may comprise a planning horizon, which is the duration of the time period covered by a supply chain planning problem, such as, for example, one year. The planning horizon of the network representation model may be broken down into elementary time-units, such as, for example, time-buckets, or, simply, buckets, which may comprise, for example, daily buckets, weekly buckets, monthly buckets, quarterly buckets, or the like. Although the planning horizon is described as one year and the time-buckets are described as daily buckets, weekly buckets, monthly buckets, or quarterly buckets, embodiments contemplate a planning horizon comprising any suitable planning period divided into any number of time-buckets having time periods of any suitable duration, according to particular needs. Flow-balance constraints for buffers and/or time-buckets model the material movement in supply chain network 100. Although the network representation model is described as comprising a particular network of nodes and edges, embodiments contemplate other suitable models that represent one or more components of supply chain network 100, according to particular needs. In particular, a supply chain planning problem typically comprises a supply chain network much more complex than the simplified network representation model described above. For example, supply chain network 100 often comprises multiple manufacturing plants located in different regions or countries. In addition, an item may be processed by many operations into a large number of different materials and items, where the different operations may have multiple constrained resources and multiple input items, each with their own lead, transportation, production, and cycle times. Additionally, material may flow bi-directionally (either, upstream, downstream, or both). Supply chain network models 224 may be associated with one or more supply chain constraints, stored as constraints data 226, including, for example, business constraints, scheduling constraints, and discrete constraints. By way of example only and not by way of limitation, constraints data 226 comprises sequence dependent setup times, lot-sizing, storage, shelf life, and the like.

Measures data 228 comprises one or more measures that are sourced from a table, data, statistical formula, AI prediction, heuristic, optimization, and/or the like. Supply chain semantic layer 450 may store each of the one or more measures with associated access and computation information. By way of example only and not by way of limitation, one or more measures are sourced from API 242 accessing an external data source, an ML engine from one ore more planning and execution systems 130, a supply chain database such as, for example, data platform 308, and the like. The one or more measures may comprise a single data point (e.g., a point in time), or a plan generated over a set of points (e.g., a plan generated by a planning engine of one or more planning and execution systems 130). The one or more measures may be stored in measures data 228 as a measure model, which forms the basis for a measure graph, which in turn is used for optimizing and using the right measures to achieve business goals. According to embodiments, the measure model comprises the connections between the one or more measures and the method for priming the one or more measures.

According to embodiments, dimensions data 230 represents the parameters and features that are relevant and contribute to the analysis of the measures. By way of example only and not by way of limitation, dimensions data 230 comprises product dimensions, location dimensions, and customer entity dimensions.

According to embodiments, facts data 232 comprises measures/metrics and facts about a business process and has direct association to dimensions data 230 that corresponds to the parameters that were/are relevant to facts data 232. By way of example only and not by way of limitation, facts data 232 comprises sales data where sales in dollars is the measure and is associated with a customer dimension corresponding to the buyer, the product dimension corresponding to the sold item, and the like. According to embodiments, business goals are related and tracked via measures/metrics that are captured in facts that have associated dimensions. In some embodiments, a fact captures or represents multiple measures. These measures may relate to one or more other measures and one or more of such facts may correlate with a higher-level desired business goal. The measure model captures the dynamic relationship between measures and the associated relationship to business goals.

Database 114 of multi-layered intelligence system 110 comprises one or more goals, stored as goals data 234. According to embodiments, the one or more goals comprise a higher-level measure defined by one or more lower-level measures. The one or more goals may be associated with one or more resolutions that optimize the one or more goals. According to some embodiments, goals data 234 comprises one or more business goals. As disclosed above, anomaly detection engine 212 monitors and detects anomalies 236 of the one or more measures. For example, when a sales measure for a given item at a given location drops rapidly, this may be anomaly 236 that gets detected by anomaly detection engine 212. As disclosed above, one or more alerts 238 comprise machine-readable or natural language forms generated in response to one or more anomalies 236 detected by anomaly detection engine 212. Alerts 238 may provide an indication that the one or more measures are not aligned with the expected values to achieve the associated goal. Resolutions data 240 comprises the one or more resolutions, which may provide one or more options to modify the supply chain to correct anomaly 236 and achieve, at least in part, one or more goals associated with anomalous measures. APIs 242 comprise connectors that retrieve one or more measures from one or more external systems 470. According to embodiments, APIs 242 provide for sending and receiving data between multi-layered intelligence system 110 and one or more external systems 470, as described in further detail below.

Database 114 comprises supply chain brain layer models 244, which supply chain brain layer 430 utilizes to calculate one or more measures. As described in further detail below, supply chain brain layer 430 may calculate one or more measures directly using one or more calculation and computation models, such as, for example, heuristics, predictive models, prescriptive models, ML models 310, AI models, and the like. External data 246 comprises data received from one or more external systems 470. By way of example only and not by way of limitation, one or more external systems 470 comprise weather, social media, news, and other data sources external to supply chain network 100. In addition, or as an alternative, one or more external systems 470 comprise supply chain planning information from one or more supply chain entities 150 and/or one or more planning and execution systems 130.

Natural language processing system 120 comprises server 122 and database 124, as disclosed above. Although natural language processing system 120 is shown as comprising a single server 122 and a single database 124, embodiments contemplate any suitable number of servers or databases internal to or externally coupled with natural language processing system 120. Server 122 of natural language processing system 120 comprises conversation engine 250, natural language processing engine 252, and knowledge base 254. Although server 122 is shown and described as comprising a single conversation engine 250, a single natural language processing engine 252, and a single knowledge base 254, embodiments contemplate any suitable number or combination of these located at one or more locations, local to, or remote from natural language processing system 120, such as on multiple servers or computers 160 at one or more locations in supply chain network 100.

Conversation engine 250 provides a conversation interface (such as, for example, a chatbot interface) for sending and receiving messages and displaying the incoming and outgoing messages, as described in further detail below. Natural language processing engine 252 implements natural language phrases related to information needs, user input, initiating tasks and actions, and the like. In one embodiment, conversation engine 250 transmits voice- and text-based user inputs to natural language processing engine 252, such as, for example, a third-party natural language processing system (such as, for example, GOOGLE Dialogue Flow or MICROSOFT Bot Framework) and receives the intent mapped to the natural language input. In one embodiment, conversation engine 250 provides user interaction such as, for example, responses to queries 422, alerts 238, and resolutions delivered in a natural, understandable form. According to embodiments, natural language processing system 120 interprets a user input according to one or more meta-classes such as, for example, RECOGNIZE <specific information>, OVERVIEW <data set>, SELECT <option>, ENTER <content>, INITIATE <execution of service>, and/or the like. By way of example only and not by way of limitation, identifying a user intent according to the RECOGNIZE meta-class comprises identifying a single value, fact, or item and providing by an output device, a name, value, fact, or the like. In addition, or as an alternative, an OVERVIEW meta-class comprises identifying a dataset or collection of items and providing by an output device, a list of items or datasets, a summary statement of the items or data sets, a first item or a predetermined number of items or datasets, a list of tasks, actions, navigations, and the like. According to embodiments, a SELECT meta-class comprises selecting an existing item or value and providing for an input to displayed or predetermined list or dataset, a selection from a list of options (including a dynamic list of options), and the like. Embodiments contemplate an ENTER meta-class that identifies user-defined content within the natural language input and provides for entry of user-input according to the interpretation by natural language processing system 120. Embodiments of the INITIATE meta-class comprises executing a service, which may include executing a service of one or more planning and execution systems 130 according to one or more parameters identified in the natural language input. According to embodiments, knowledge base 254 stores a searchable index of definitions which define the actions associated with each intent. In addition, or as an alternative, knowledge base 254 may comprise the entities and slots that define parameters of the action.

Database 124 of natural language processing system 120 may comprise one or more databases or other data storage arrangement at one or more locations, local to, or remote from, server 122. Database 124 of natural language processing system 120 comprises, for example, intent index 260 and contextual data 262. Although database 124 of natural language processing system 120 is shown and described as comprising intent index 260 and contextual data 262, embodiments contemplate any suitable number or combination of these, located at one or more locations, local to, or remote from, natural language processing system 120 according to particular needs.

According to embodiments, intent index 260 is used by natural language processing engine 252 to assign the closest-matching intents to speech or text inputs received from one or more users. The intents are categorical assignments that describe the purpose or goal of the natural language input. One or more alternative phrases may be mapped to the same intent. In some embodiments, natural language processing engine 252 utilizes contextual data 262 to override an action or task identified by the intent of the natural language input, by relying on additional contextual data 262, which may include, but is not limited to, previously-decoded speech, the text or graphics currently displayed on conversation interface, the GUI interface, a navigation history, and other like data. Conversation engine 250 may send an event to a service of multi-layered intelligence system 110, a client system, or the like, and which is mapped to the corresponding GUI interface.

As disclosed above, planning and execution system 130 may comprise server 132 and database 134. Although planning and execution system 130 is shown as comprising a single server 132 and a single database 134, embodiments contemplate any suitable number of servers or databases internal to or externally coupled with planning and execution system 130. Server 132 of planning and execution system 130 comprises planning module 270 and execution module 272. Although server 132 is shown and described as comprising a single planning module 270 and a single execution module 272, embodiments contemplate any suitable number or combination of planning modules and execution modules, located at one or more locations, local to, or remote from planning and execution system 130, such as on multiple servers or computers 160 at one or more locations in supply chain network 100. Database 134 of planning and execution system 130 may comprise one or more databases or other data storage arrangement at one or more locations, local to, or remote from, server 132. Database 134 of planning and execution system 130 comprises, for example, transaction data 280, supply chain data 282, product data 284, inventory data 286, inventory policies 288, store data 290, customer data 292, and supply chain models 294. Although database 134 of planning and execution system 130 is shown and described as comprising transaction data 280, supply chain data 282, product data 284, inventory data 286, inventory policies 288, store data 290, customer data 292, and supply chain models 294, embodiments contemplate any suitable number or combination of data, located at one or more locations, local to, or remote from, supply chain planning and execution system 130, according to particular needs.

Planning module 270 comprises modeler 274 and solver 276. Although planning module 270 is shown and described as comprising a single modeler 274 and a single solver 276, embodiments contemplate any suitable number or combination of these located at one or more locations, local to, or remote from planning module 270, such as on multiple servers or computers 160 at any location in supply chain network 100. Modeler 274 may model one or more supply chain planning problems of supply chain network 100. According to one embodiment, modeler 274 of server 132 identifies resources, operations, buffers, and pathways, and maps supply chain network 100 using supply chain network models 224, as disclosed above. For example, modeler 274 of server 132 models a supply chain planning problem that represents supply chain network 100 as supply chain network model 224, an LP optimization problem, or other type of input to a supply chain solver. As disclosed above, embodiments contemplate modeler 274 providing supply chain network model 224 to multi-layered intelligence system 110. According to embodiments, solver 276 of planning module 270 generates a solution to a supply chain planning problem. Supply chain solver 276 may comprise an LP optimization solver, a heuristic solver, a mixed-integer problem solver, a MAP solver, an LP solver, a Deep Tree solver, and the like. According to some embodiments, solver 276 solves a supply chain planning problem.

Execution module 272 executes one or more supply chain processes such as, for example, instructing automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of items based on a supply chain plan, the number of items currently in stock at one or more supply chain entities 150, the number of items currently in transit in the transportation network, a forecasted demand, a supply chain disruption, a material or capacity reallocation, current and projected inventory levels at one or more stocking locations, a selected lever, and/or one or more additional factors described herein. For example, execution module 272 may send instructions to the automated machinery to locate items to add to or remove from an inventory of or shipment for one or more supply chain entities 150.

Transaction data 280 may comprise recorded sales and returns transactions and related data, including, for example, a transaction identification, time and date stamp, channel identification (such as stores or online touchpoints), product identification, actual cost, selling price, sales volume, customer identification, promotions, and or the like. In addition, transaction data 280 is represented by any suitable combination of values and dimensions, aggregated or un-aggregated, such as, for example, sales per week, sales per week per location, sales per day, sales per day per season, or the like. Supply chain data 282 may comprise any data of one or more supply chain entities 150 including, for example, item data, identifiers, metadata (comprising dimensions, hierarchies, levels, members, attributes, cluster information, and member attribute values), fact data (comprising measure values for combinations of members) of one or more supply chain entities 150. Supply chain data 282 may also comprise for example, various decision variables, business constraints, goals, and objectives of one or more supply chain entities 150. According to some embodiments, supply chain data 282 may comprise hierarchical objectives specified by, for example, business rules, master planning requirements, scheduling constraints, and discrete constraints, including, for example, sequence dependent setup times, lot-sizing, storage, shelf life, and the like. Product data 284 of database 134 may comprise products identified by, for example, a product identifier (such as a Stock Keeping Unit (SKU), Universal Product Code (UPC) or the like), and one or more attributes and attribute types associated with the product ID. Product data 284 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 286 of database 134 may comprise any data relating to current or projected inventory quantities or states, order rules, or the like. For example, inventory data 286 may comprise the current level of inventory for each item at one or more stocking points across supply chain network 100. In addition, inventory data 286 may comprise order rules that describe one or more rules or limits on setting an inventory policy, including, but not limited to, a minimum order volume, a maximum order volume, a discount, and a step-size order volume, and batch quantity rules. According to some embodiments, planning and execution system 130 accesses and stores inventory data 286 in database 134, which may be used by planning and execution system 130 to place orders, set inventory levels at one or more stocking points, initiate manufacturing of one or more components, or the like in response to, and based at least in part on, a supply chain plan or other output of planning and execution system 130. In addition, or as an alternative, inventory data 286 may be updated by receiving current item quantities, mappings, or locations from one or more planning and execution systems 130 and/or one or more networked communication devices 140. Inventory policies 288 of database 134 may comprise any suitable inventory policy describing the reorder point and target quantity, or other inventory policy parameters that set rules for planning and execution system 130 to manage and reorder inventory. Inventory policies 288 may be based on target service level, demand, cost, fill rate, or the like. According to embodiments, inventory policies 288 comprise target service levels that ensure that a service level of one or more supply chain entities 150 is met with a certain probability. For example, one or more supply chain entities 150 may set a service level at 95%, meaning one or more supply chain entities 150 set the desired inventory stock level at a level that meets demand 95% of the time. Although, a particular service level target and percentage is described; embodiments contemplate any service target or level, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, multi-layered intelligence system 110 and/or planning and execution system 130 may determine a replenishment order according to one or more replenishment rules, which, among other things, indicates to one or more supply chain entities 150 to determine or receive inventory to replace the depleted inventory. By way of example and not of limitation, an inventory policy for non-perishable goods with linear holding and shorting costs comprises a min./max. (s,S) inventory policy. Other inventory policies 288 may be used for perishable goods, such as fruit, vegetables, dairy, fresh meat, as well as electronics, fashion, and similar items for which demand drops significantly after a next generation of electronic devices or a new season of fashion is released.

Store data 290 may comprise data describing the stores of one or more retailers and related store information. Store data 290 may comprise, for example, a store ID, store description, store location details, store location climate, store type, store opening date, lifestyle, store area (expressed in, for example, square feet, square meters, or other suitable measurement), latitude, longitude, and other similar data. Store data 290 may include demand forecasts for each store indicating future expected demand based on, for example, any data relating to past sales, past demand, purchase data, promotions, events, or the like of one or more supply chain entities 150. The demand forecasts may cover a time interval such as, for example, by the minute, hour, daily, weekly, monthly, quarterly, yearly, or any suitable time interval, including substantially in real time. Although demand forecasts are described as comprising a particular store, planning and execution system 130 may calculate a demand forecast at any granularity of time, customer, item, region, or the like. Customer data 292 may comprise customer identity information, including, for example, customer relationship management data, loyalty programs, and mappings between one or more customers and transactions associated with those one or more customers such as, for example, product purchases, product returns, customer shopping behavior, and the like. Customer data 292 may comprise data relating customer purchases to one or more products, geographical regions, store locations, time period, or other types of dimensions. Supply chain models 294 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 294 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to a different supply chain model.

Figure 3:
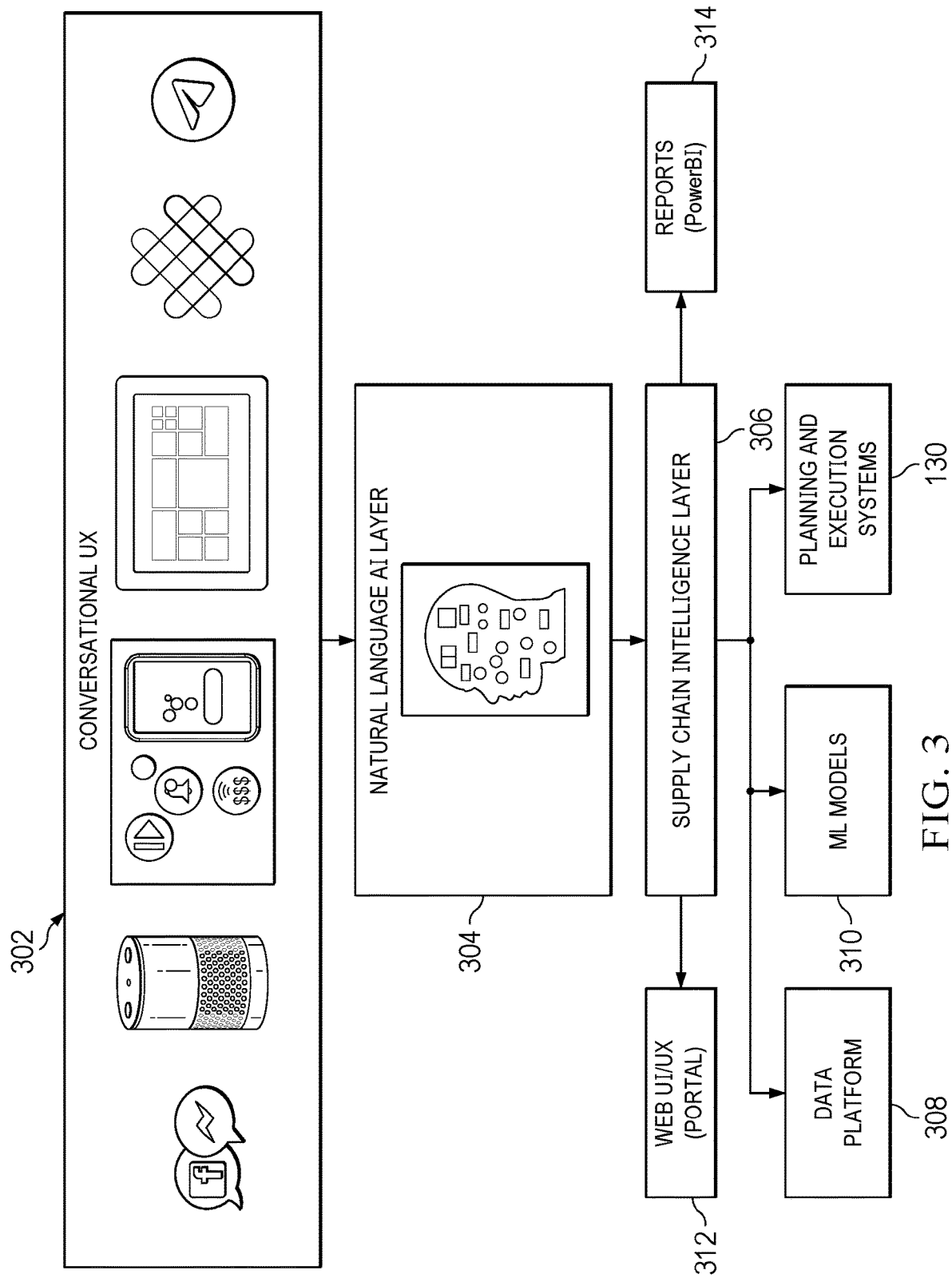
FIG. 3 illustrates a flowchart of the multi-layered intelligence system and the natural language processing system of FIG. 1, in accordance with an embodiment.

FIG. 3 illustrates flowchart 300 of multi-layered intelligence system 110 and natural language processing system 120 of FIG. 1, in accordance with an embodiment. Flowchart 300 shows natural language AI layer 304 of natural language processing system 120 receiving natural language input from conversational user interface 302 of conversation engine 250. As described in further detail below, one or more client devices 480 generate conversational user interface 302 for receiving natural language voice or text. Multi-layered intelligence system 110 utilizes supply chain intelligence layer 306 of knowledge base 254 to receive natural language input from natural language AI layer 304 of natural language processing engine 252 and provides query responses, insights, recommendations, and alerts 238 to natural language AI layer 304 for display on conversational user interface 302. Supply chain intelligence layer 306 generates query responses, insights, recommendations, and alerts 238 using the data platform 308, ML models 310 of AI/ML models 222, and planning and execution systems 130. Supply chain intelligence layer 306 may further couple with web-browser user interface portal 312 and report generating system 314. Supply chain intelligence layer 306 may serve queries 422 and interact with web-based user-interface portals 312 and reporting tools like PowerBI using standard Web API mechanisms in addition to the natural language AI layer 304.

As described in further detail below, supply chain intelligence layer 306 provides business intelligence (such as, for example, responding to queries 422 based on existing facts), generates predictions (such as, for example, using ML-based models), generates recommendations and plans, and predicts prescriptive analytics using a unifying semantic intelligence layer that maps internal and external supply chain data 282 (such as, for example, from data platform 308 and planning and execution systems 130) and supply chain models 294. The semantic layer is integrated with natural language AI layer 304 to provide supply chain semantics to natural language communications.

Figure 4:
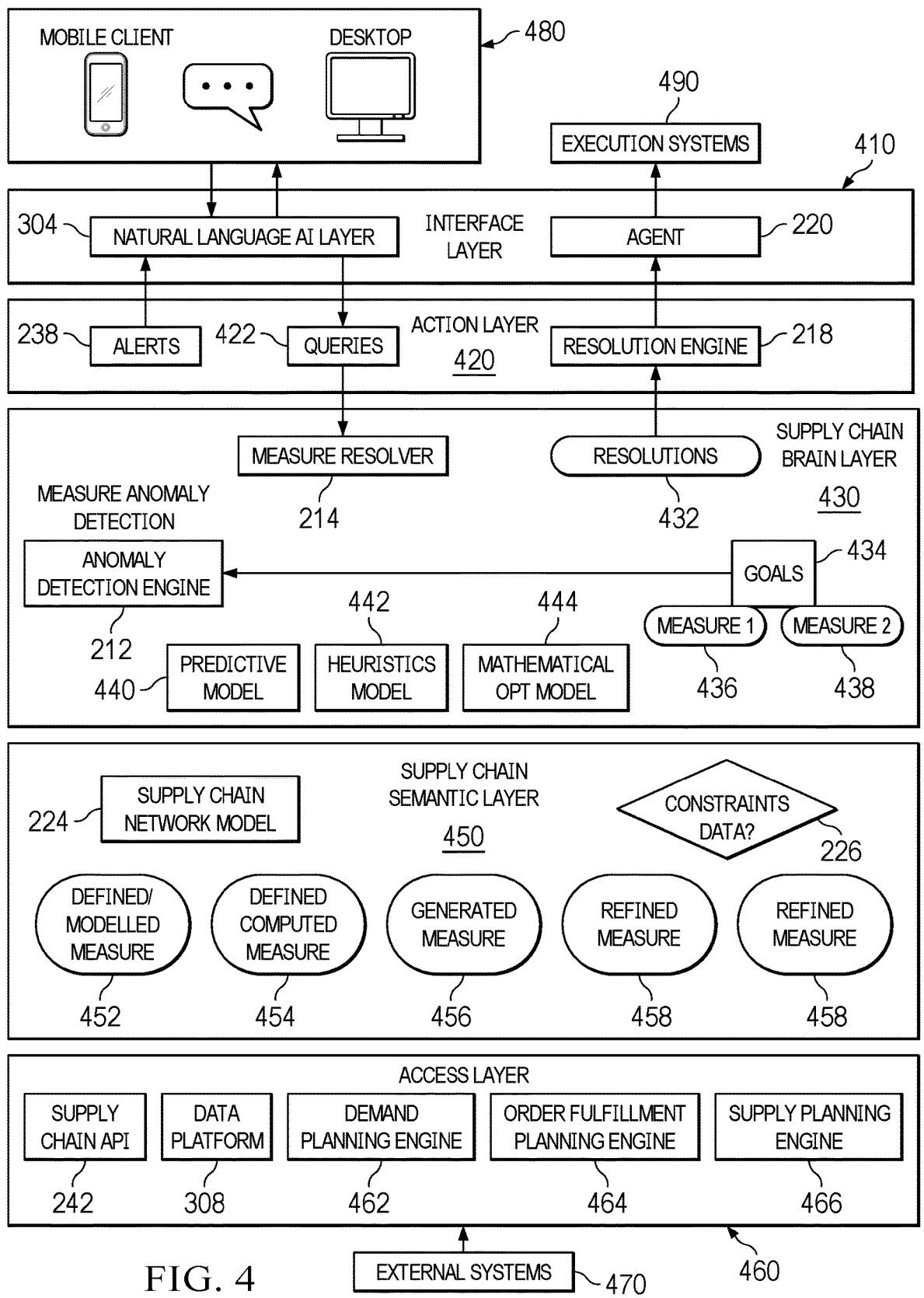
FIG. 4 illustrates multi-layered intelligence system, in accordance with a further embodiment.

FIG. 4 illustrates multi-layered intelligence system 110, in accordance with a further embodiment. Multi-layered intelligence system 110 comprises interface layer 410, action layer 420, supply chain brain layer 430, supply chain semantic layer 450, access layer 460, and external data systems 470. According to embodiments, the multi-layered organization of interface layer 410, action layer 420, supply chain brain layer 430, supply chain semantic layer 450, access layer 460, and external systems 470 forms a cognitive operating system that provides holistic, proactive, and natural supply chain intelligence.

Supply chain semantic layer 450 of multi-layered intelligence system 110 comprises supply chain network model 224, constraints data 226, one or more measures, and the measure relationships. As discussed in greater detail above, supply chain network model 224 represents the flow of materials through one or more supply chain entities 150 of supply chain network 100 and may model buffers representing one or more items within the modeled supply chain network as nodes. The edges connecting these nodes may indicate the flow of items between one or more buffers and one or more operations. As disclosed above, constraints data 226 comprises one or more supply chain constraints, including, for example, business constraints, scheduling constraints, flow constraints, and discrete constraints (e.g., sequence dependent setup times, lot-sizing, storage, shelf life, and the like).

Supply chain semantic layer 450 captures and builds the measures and the measure relationships, which evolve over time. According to embodiments, multi-layered intelligence system 110 connects each of the measures to access layer 460 to retrieve the data needed to compute the one or more measures. In one embodiment, supply chain semantic layer 450 retrieves the one or more measures from supply chain brain layer 430, which correlates and relates the one or more measures. In addition, or as an alternative, supply chain brain layer 430 evaluates and computes the one or more measures using various approaches (e.g., historical, statistical, heuristic, mathematical, etc.) to select which one or more measures results in optimized goals and outcomes. According to embodiments, supply chain brain layer 430 adapts, computes, and optimizes the measure model based on performance, user feedback, and tracking resolutions to determine which measures more closely track with achieving the one or more goals. In the illustrated embodiment, supply chain semantic layer 450 comprises defined/modelled measure 452, defined computed measure 454, generated measure 456, and two refined measures 458. Supply chain semantic layer 450 receives the data from access layer 460 and stores generated measure 456 or refined measure 458 that are generated, autonomously correlated, and/or computed by supply chain brain layer 430, which may provide a better outcome than the measures accessed directly from access layer 460. Although supply chain semantic layer 450 is shown and described as comprising a single defined/modelled measure 452, a single defined computed measure 454, a single generated measure 456, and two refined measures 458, embodiments contemplate any number of one or more measures that may be modeled, computed, generated, refined, received, or the like, according to particular needs.

Access layer 460 comprises supply chain APIs 242, data platform 308, demand planning engine 462 of one or more planning and execution systems 130, order fulfillment planning engine 464 of one or more planning and execution systems 130, and supply planning engine 466 of one or more planning and execution systems 130. According to embodiments, supply chain APIs 242 communicate with data feeds that prime data platform 308, such as, for example, execution systems 490, external data 246, internal data, weather data, social media, and any other internal or external systems 470 that provide data to multi-layered intelligence system 110. Although access layer 460 is described as comprising a demand planning engine 462, an order fulfillment planning engine 464, and a supply planning engine 466, embodiments contemplate access layer 460 comprising engines or modules from any one or more planning and execution systems 130 that generate one or more measures for supply chain semantic layer 450, according to particular needs. By way of example only and not by way of limitation, one or more measures may comprise a demand plan time series generated by demand planning engine 462 and a point-of-sale stream comprising API 242 monitoring a point of sale system.

Supply chain brain layer 430 of multi-layered intelligence system 110 comprises anomaly detection engine 212, measure resolver 214, one or more resolutions 432 of resolutions data 240, one or more goals 434 of goals data 234, first measure 436, second measure 438, and one or more supply chain brain layer models 244 (shown in this embodiment as predictive model 440, heuristics model 442, and mathematical model 444). Supply chain brain layer 430 may retrieve a value from access layer 460. In addition, or as an alternative, supply chain brain layer 430 stores measure models on top of the one or more measures. According to embodiments, supply chain brain layer 430 comprises predictive models 440, mathematical models 444, and heuristic models 442. Supply chain brain layer 430 may resolve the measure using any one or more of supply chain brain layer models 244.

On top of semantic model 204 is the representation of a goal, which is a higher-level measure, the various dimensions that affect this measure, and one or more other measures. As disclosed above, semantic model 204 tracks relationships among the one or more measures, whether the one or more measures are synonymous or connected, and how the one or more measures are sourced (e.g., computed, modeled, received from external system 470, and the like). Supply chain brain layer 430 monitors one or more goals 434 and the measures to detect anomalies 236. When one or more anomalies 236 are detected, supply chain brain layer 430 may trigger alerting engine 216 and resolution engine 218. By way of further explanation only and not by way of limitation, an example of a goal may comprise a quarterly fulfillment target. Continuing with this example, anomaly detection engine 212 of supply chain brain layer 430 may monitor a measure (order fill rates) associated with the goal and, when the order fill rate is not aligned with the expected values needed to achieve the quarterly fulfillment target, action layer 420 may generate alerts 238 to notify a user and/or one or more execution systems 490 and generate any resolutions 432 that may correct for anomaly 236.

Action layer 420 comprises alerts 238, queries 422, and resolution engine 218. Queries 422 and alerts 238 are routed to and from action layer 420, which crafts the responses based on the interaction between supply chain brain layer 430 and supply chain semantic layer 450 that communicates with access layer 460. Multi-layered intelligence system 110 may execute resolution workflows defined by the user or recommended by resolution engine 218.

According to embodiments, interface layer 410 comprises natural language AI layer 304 and agents 220. Interface layer 410 provides natural language communication with one or more client devices 480 and machine-form communication with one or more execution systems 490. According to embodiments, multi-layered intelligence system 110 communicates with one or more client devices 480 using natural language AI layer 304 to provide responses to user questions, user and system insights, and resolutions 432 (or other actions) in a natural language form that may prompt the user for confirmation, selection, or input. The natural language interaction with the user may be conversational or pushed using natural language actionable summaries. Continuing with the previous example, natural language alert 238 may comprise a notification that "Your order fill rates are off, and they are important to achieve the target you are working towards for the quarter." Natural language alert 238 may be displayed with the natural language resolution. Continuing with the order fulfillment target example, the natural language resolution may comprise a voice or text-based natural language message stating "You may improve your order fill rates by choosing a different shipper. You may also route some of your orders to [SHIPPER #2] because your fulfillment from [SHIPPER #1] is not happening at the right levels."

One or more client devices 480 comprise one or more networked electronic communication devices, such as, for example, a tablet computer, a smartphone, a computer, and the like, as disclosed above. According to some embodiments, client devices 480 comprise a thick client, such as, for example, a software application, compiled and running on computer 160 or server 112. According to other embodiments, client device 480 comprises a thin client, such as, for example, code executed by a webpage within a web browser. According to some embodiments, client device 480 comprises a hybrid client comprising features of both thick and thin clients. Client device 480 is configured to display the GUI of multi-layered intelligence system 110, receive user inputs, transmit user inputs to multi-layered intelligence system 110 or one or more planning and execution systems 130, and request and receive information from multi-layered intelligence system 110 and one or more planning and execution systems 130, as described in further detail below.

In addition, or as an alternative, multi-layered intelligence system 110 communicates with one or more execution systems 490 using one or more agents 220. As disclosed above, agents 220 execute alerts 238 and resolutions 432 at one or more executions systems 490. When one or more outliers (or other anomalies 236) are detected on relevant measures, agents 220 execute one or more resolutions 432 pushed in a machine form that results in better outcomes for the enterprise.

Supply chain brain layer 430 identifies execution system 490 responsible for adjusting the measure and instructs agents 220 to communicate the message to execution system 490 or to API 242 to effect the adjustment. For example, agents 220 may communicate messages to an ERP system, a management system, a pricing system, and the like. Agents 220 communicate to one or more execution systems 490 to initiate one or more automatic or user-selected interventions, such as, for example, to adjust cost, price, timing, quantity, speed, delivery method or route, add or remove an item from a shipment, or other adjustment. In one embodiment, execution system 490 receives a communication to adjust the delivery method to air from ground, when a percentage-on-time is lower than a threshold value in order to avoid late shipments.

Figure 5:
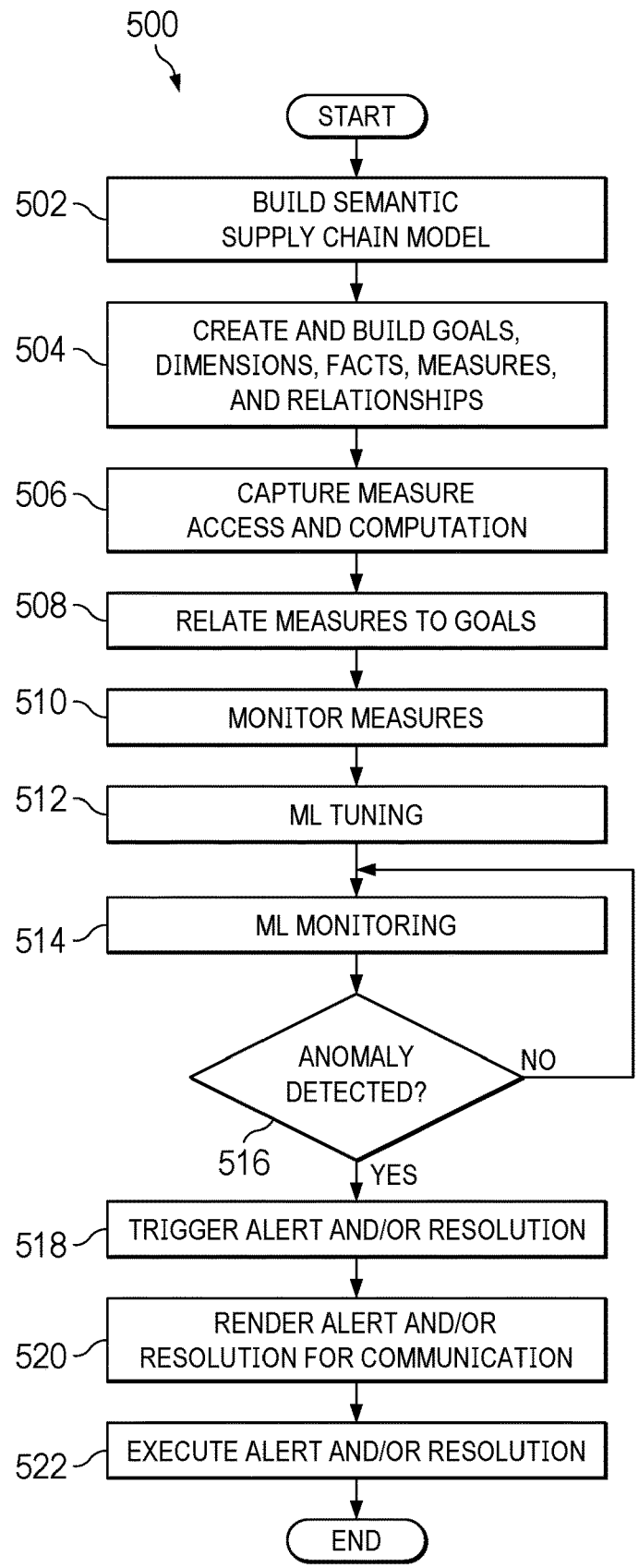
FIG. 5 illustrates a multi-layered supply chain intelligence method, in accordance with an embodiment.

FIG. 5 illustrates multi-layered supply chain intelligence method 500, in accordance with an embodiment. Method 500 comprises one or more activities, which although described in a particular order may be implemented in one or more combinations, according to particular needs.

At activity 502, semantic supply chain modeler 202 of multi-layered intelligence system 110 builds semantic model 204 of the supply chain to represent the supply chain elements. Although not shown in FIG. 4, embodiments contemplate supply chain semantic layer 450 comprising semantic supply chain modeler 202. For example, based, at least in part, on the configuration of the enterprise goals and the configuration specified by the user, the system may construct the metadata indicating the relevance of one or more measures. According to an embodiment, the business goals of one or more supply chain entities 150 may comprise a higher-level goal of growth of 10% in the next quarter, semantic model 204 includes the historical sales, forecasted sales, cost of goods sold, capital costs, pricing, and promotions that are needed to optimize the higher-level sales objective.

At activity 504, semantic supply chain modeler 202 of multi-layered intelligence system 110 builds, on semantic model 204, one or more goals, dimensions, facts, and measures to construct one or more measure graphs to represent one or more supply chain planning scenarios. By way of example only and not by way of limitation, measures of forecasted sales, cost of goods sold, capital costs, prices, and promotions are connected in a measure graph that captures how the overall sales goal is related to each of these other measures. According to one embodiment, supply chain brain layer 430 calculates the one or more measures according to historical supply chain values, statistical and/or AI/ML predictions, and/or heuristically-derived, mathematically-calculated, and/or optimized (such as, for example, linear programming optimized) values. By way of further explanation only and not by way of limitation, an example of method 500 is given for a sales target goal, which is associated with price and stock level measures.

At activity 506, semantic model 204 captures and stores the access and computation information for the one or more measures. Embodiments contemplate the one or more measures are accessed and computed by one or more of supply chain brain layer 430, data platform 308, one or more API services, AI/ML engines, or the like, as disclosed above. Supply chain intelligence layer 306 accesses the access and computation information to monitor the one or more measures, determine the relationship between the one or more measures and the one or more goals, and tune the one or more measures to more accurately track the one or more goals. Multi-layered intelligence system 110 accesses the one or more measures according to the access and computation information, which identifies where to source the one or more measures. By way of example only and not by way of limitation, one or more measures are retrieved from one or more external systems 470 using one or more APIs 242. According to an embodiment, one or more external systems 470 comprise supplier data, which are retrieved using one or more APIs 242. In addition, or as an alternative, the one or more measures are calculated using ML model 310, which is identified by the access and computation information associated with the one or more measures. Continuing with this example, supply chain brain layer 430 utilizes one or more mathematical models and calculates the one or more measures according to the access and computation information. Continuing with the example of the sales target goal, semantic model 204 may determine the access and computation information for the price and stock level measures. In this example, the price measure is sourced from an external pricing system using one or more APIs 242 and the stock level measure is received from the inventory management system.

At activity 508, measure monitor 206 relates one or more measures to one or more goals. Although not shown in FIG. 4, embodiments contemplate measure monitor 206 in supply chain brain layer 430. According to embodiments, multi-layered intelligence system 110 receives one or more goals, which comprise one or more measures and resolutions that optimize the one or more goals. For the above-disclosed example of the sales target goal, the price measure and the stock level measure influence the sales target. The resolutions associated with the sales target goal may comprise adjusting the price, placing an order to refill low inventory, selecting a different shipper or route, and the like. At activity 510, measure monitor 206 monitors one or more measures associated with the one or more goals. For the sales target example provided above, supply chain brain layer 430 monitors stock level, price, and other measures associated and related to the sales target. Although an example of a particular goal and one or more measures are disclosed, embodiments contemplate monitoring any one or more measures associated with any one or more goals, according to particular needs.

At activity 512, ML tuner 208 of multi-layered intelligence system 110 fine tunes measures using one or more ML models 310. According to embodiments, ML model 310 tracks outcomes and user actions associated with the one or more measures and goals, updates ML model 310 to learn from previous resolutions and actions. For the sales target example, supply chain brain layer 430 may determine that price does not have as great an effect on sales target as stock level and may modify the weight of the various measures in tracking the sales target goal. At activity 514, anomaly detection engine 212 of multi-layered intelligence system 110 uses one or more ML models 310 to monitor for abnormal patterns of the one or more measures. According to embodiments, supply chain brain layer 430 performs anomaly detection using ML approaches to identify when the one or more measures show abnormal patterns. According to embodiments, the anomaly detection of supply chain brain layer 430 provides for on-time and near-real time supply chain reaction. Continuing with the sales target goal example, supply chain brain layer 430 may detect anomaly 236 when the stock level is not aligned with a target inventory level or when the price is calculated to be so high that too many sales are lost to meet the sales target. When anomaly detection engine 212 detects anomaly 236 at activity 516, method 500 continues to activity 518 where supply chain brain layer 430 triggers alerting engine 216 to send an alert 238 and/or resolution engine 218 to send a resolution. According to embodiments, supply chain brain layer 430 comprises alerting engine 216. In addition, or as an alternative, action layer 420 comprises alerting engine 216. In one embodiment, alerting engine 216 generates one or more alerts 238 in response to supply chain brain layer 430 detecting anomaly 236. In addition, or as an alternative, the abnormal measure triggers resolution engine 218. According to embodiments, resolution engine 218 correlates the current supply chain context and recommends the optimal solution using AI and ML approaches. Continuing with the previous example, resolution engine 218 may determine that a promotion is needed to resolve a sales target that is not tracking at a certain level. For example, supply chain brain layer 430 calculates that the price measure needs to be reduced by 2% for certain categories or a certain set of products to meet the sales target by the end of the target period.

At activity 520, natural language processing engine 252 renders one or more alerts 238 and/or resolutions for communication to one or more users. According to embodiments, the results of one or more alerts 238 and/or resolutions are sent to natural language AI layer 304 and rendered in a natural language format for communication to one or more users. In addition, or as an alternative, autonomous agents 220 (or bots) render the results of one or more resolutions in machine form (e.g., JSON) and communicate the rendered results to one or more execution systems 490 of the supply chain. In one embodiment, natural language AI layer 304 renders one or more alerts 238 and resolutions with a request for approval or feedback. Continuing with the sales target example, supply chain brain layer 430 uses the measure access and computation information to identify that the price adjustment is performed at the pricing system. Agent 220 may communicate the price change to the price adjustment system of execution systems 490 using a JSON formatted communication comprising a product or group of products, the amount of the price reduction(s), and a time period. For example, the price change may be a 2% price reduction for two weeks. Although embodiments are described as communicating a particular price change for a particular time period using JSON format, embodiments contemplate agents 220 communicating any instructions to execution systems 490 using any suitable machine-readable format, according to particular needs.

At activity 522, one or more client devices 480 executes one or more alerts 238 and/or execution systems 490 executes one or more resolutions. According to embodiments, one or more client devices 480 executes one or more alerts 238 by displaying a message in natural language form on conversational user interface 302. Embodiments contemplate automatically executing one or more alerts 238 and resolutions. In addition, or in the alternative, one or more alerts 238 and resolutions may comprise a request for approval prior to executing alert 238 and the resolution, according to particular needs. In one embodiment, multi-layered intelligence system 110 monitors the executed resolution and trains machine learning model 310 to identify the results of executed resolutions on measures to adjust the calculation or selection of the one or more measures, select a different resolution, and the like. According to embodiments, multi-layered intelligence system 110 learns by monitoring and training ML model 310 based on one or more executed and simulated resolutions, user-approved or rejected actions, differences between outcomes and goals, correlation between measures and outcomes, and the like. Multi-layered intelligence system 110 provides significantly more efficient outcomes for achieving supply chain objectives and/or goals for an enterprise and enables an autonomous supply chain driven by goals where measures are evaluated, computed, monitored, and correlated to drive the goals desired by the supply chain. In addition, the core cognitive operating system enabled by multi-layered intelligence system 110 provides planning, execution, and analytics together to more efficiently and quickly identify and resolve supply chain anomalies 236 and reduce the amount of time needed to determine an accurate resolution. The resolutions are quantifiably better, more relevant, and actionable by the user or autonomously by one or more agents 220.

Queries 422 by bots and humans are executed by supply chain brain layer 430 based on semantic understanding of the supply chain and supply chain data 282 and automatically returned in the appropriate machine or natural language form. Multi-layer intelligence system 110 provides a natural language approach which is conversational or pushed. According to embodiments, the pushed information comprises an actionable summary and insight. By way of example only and not by way of limitation, multi-layered intelligence system 110 pushes visualizations and text, such that the text-based insights are accompanied by graphs, charts, or other data visualizations that provide context to the text-based insights. Continuing with the sales target example, alert 238 that indicates that sales today are falling by 15% based on the plan for a product may be generated in a text or voice natural language form and accompanied by a graph illustrating the problem and the resolution. In addition, or as an alternative, rather than depend on pull-based results that are only able to query against a certain kind of fact, multi-layered intelligence system 110 may provide supply chain and business insight that is proactively generated based on a holistic and semantic understanding using different models of the supply chain (e.g., statistical models using historical data, machine learning model using anomalies 236 and supervised/unsupervised learning approaches, and heuristic/mathematical models based on constraints) to select and optimize one or more measures that best represent the outcomes needed to achieve the selected one or more goals, and push the right summaries and the associated resolutions to a user or agent 220 that may execute those resolutions.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A computer-implemented method for providing supply chain intelligence based on a semantic supply chain model, comprising:
    building, using a computer comprising a processor and memory, a semantic model of a supply chain;
    receiving, using one or more imaging devices with imaging sensors, identifying information from one or more items in the supply chain;
    receiving, using one or more radio receivers and transmitters, location information from the one or more items in the supply chain;
    building, using the computer, based on the semantic model, one or more goals and one or more measures to construct one or more measure graphs to represent one or more supply chain scenarios;
    storing, using the semantic model by the computer, access and computation information for the one or more measures;
    relating, using the computer, the one or more measures to the one or more goals;
    monitoring, using the computer, the one or more measures associated with the one or more goals, wherein the one or more monitored measures comprises one or more stock levels;
    tuning, using the computer, the one or more measures using one or more machine learning models by tracking outcomes and user actions associated with the one or more measures and goals to update the one or more machine learning models based on the tracked outcomes and user actions;
    monitoring, using the one or more machine learning models by the computer, for abnormal patterns of the one or more measures;
    triggering, using the computer, based on a detection of an abnormal pattern, an alert and a resolution;
    rendering, using the computer, an alert or a resolution in machine form to one or more supply chain execution systems; and
    instructing, using the computer, a robotic warehouse system to adjust the one or more stock levels.

2. The method of claim 1, wherein the machine form is JSON format.

3. The method of claim 1, wherein the rendering is performed by an autonomous agent or bot.

4. The method of claim 1, wherein the detection of the abnormal pattern comprises detecting outliers on one or more of the monitored measures.

5. The method of claim 1, wherein the semantic model further comprises metadata indicating a relevance of the one or more measures to the one or more goals.

6. The method of claim 1, wherein the alert further comprises a natural language alert with a request for approval or feedback.

7. The method of claim 6, wherein a received approval or feedback is used to further train the one or more machine learning models.

8. A system for providing supply chain intelligence based on a semantic supply chain model, comprising:
    a computer comprising a processor and a memory and configured to:
        build a semantic model of a supply chain;
        receive, using one or more imaging devices with imaging sensors, identifying information from one or more items in the supply chain;
        receive, using one or more radio receivers and transmitters, location information from the one or more items in the supply chain;
        build, based on the semantic model, one or more goals and one or more measures to construct one or more measure graphs to represent one or more supply chain scenarios;
        store, using the semantic model, access and computation information for the one or more measures;
        relate the one or more measures to the one or more goals;
        monitor the one or more measures associated with the one or more goals, wherein the one or more monitored measures comprises one or more stock levels;
        tune the one or more measures using one or more machine learning models by tracking outcomes and user actions associated with the one or more measures and goals to update the one or more machine learning models based on the tracked outcomes and user actions;
        monitor, using the one or more machine learning models, for abnormal patterns of the one or more measures;
        trigger based on a detection of an abnormal pattern, an alert and a resolution;
        render an alert or a resolution in machine form to one or more supply chain execution systems; and
        instruct a robotic warehouse system to adjust the one or more stock levels.

9. The system of claim 8, wherein the machine form is JSON format.

10. The system of claim 8, wherein the rendering is performed by an autonomous agent or bot.

11. The system of claim 8, wherein the detection of the abnormal pattern comprises detecting outliers on one or more of the monitored measures.

12. The system of claim 8, wherein the semantic model further comprises metadata indicating a relevance of the one or more measures to the one or more goals.

13. The system of claim 8, wherein the alert further comprises a natural language alert with a request for approval or feedback.

14. The system of claim 13, wherein a received approval or feedback is used to further train the one or more machine learning models.

15. A non-transitory computer-readable medium embodied with software, the software when executed configured for providing supply chain intelligence based on a semantic supply chain model by:
    building a semantic model of a supply chain;
    receiving, using one or more imaging devices with imaging sensors, identifying information from one or more items in the supply chain;

receiving, using one or more radio receivers and transmitters, location information from the one or more items in the supply chain;

building, based on the semantic model, one or more goals and one or more measures to construct one or more measure graphs to represent one or more supply chain scenarios;

storing, using the semantic model, access and computation information for the one or more measures;

relating the one or more measures to the one or more goals;

monitoring the one or more measures associated with the one or more goals, wherein the one or more monitored measures comprises one or more stock levels;

tuning the one or more measures using one or more machine learning models by tracking outcomes and user actions associated with the one or more measures and goals to update the one or more machine learning models based on the tracked outcomes and user actions;

monitoring, using the one or more machine learning models, for abnormal patterns of the one or more measures;

triggering, based on a detection of an abnormal pattern, an alert and a resolution;

rendering, using the computer, an alert or a resolution in machine form to one or more supply chain execution systems; and instructing, using the computer, a robotic warehouse system to adjust the one or more stock levels.

16. The non-transitory computer-readable medium of claim 15, wherein the machine form is JSON format.

17. The non-transitory computer-readable medium of claim 15, wherein the rendering is performed by an autonomous agent or bot.

18. The non-transitory computer-readable medium of claim 15, wherein the detection of the abnormal pattern comprises detecting outliers on one or more of the monitored measures.

19. The non-transitory computer-readable medium of claim 15, wherein the semantic model further comprises metadata indicating a relevance of the one or more measures to the one or more goals.

20. The non-transitory computer-readable medium of claim 15, wherein the alert further comprises a natural language alert with a request for approval or feedback.

* * * * *